UNITED STATES PATENT OFFICE.

JEHU H. HUNGATE, OF DENVER, COLORADO.

COMPOSITION FOR JOURNAL-BOXES.

SPECIFICATION forming part of Letters Patent No. 310,827, dated January 13, 1885.

Application filed November 14, 1884. (No specimens.)

*To all whom it may concern:*

Be it known that I, JEHU H. HUNGATE, a citizen of the United States of America, residing at Denver, in the county of Arapahoe and State of Colorado, have invented certain new and useful Improvements in a Composition for Journal-Boxes, of which the following is a specification.

The object of my invention is to produce a journal-box that can be molded or pressed into any form or shape required to take the place of the metal boxes ordinarily used, and at the same time be self-lubricating, thus saving the time and expense of oiling; and the invention consists, mainly, in the peculiar composition and the mode of making the same, as hereinafter more fully described and claimed.

The composition as I prefer to make it consists of the following ingredients, in about the proportions named, which proportions, however, may be modified to a considerable extent without departing from the spirit of my invention: pulverized asbestus, one pound; pulverized mica, one pound; plumbago, one-half pound; common salt, one-half pound; glue, one-fourth pound.

In mixing this composition I first dissolve the glue in water, and then add the other ingredients and thoroughly mix the same until the mass becomes of the consistency of putty, after which I put it into molds and press the same in a powerful hydraulic press. The boxes thus produced are then put into an oven and baked until hard.

In lieu of the glue, I may sometimes use some other cementing material, such as dissolved shellac, flour-paste, &c.; but I prefer the glue.

I sometimes dispense with the molds and press the composition directly into the castings in which the boxes are to be used, and then bake them therein.

By the use of this composition a box may be formed that will be very cheap, durable, easily set and secured in place, and one that will be self-lubricating, thus dispensing with the expense and attention necessary with metal boxes.

What I claim as new is—

1. The composition for journal-boxes herein described, consisting of asbestus, mica, plumbago, salt, and a cementing substance, substantially as described.

2. The journal-box herein described, consisting of a composition of asbestus, mica, plumbago, salt, and glue pressed into shape and then baked, substantially as described.

In testimony whereof I affix my signature, in presence of two witnesses, this 8th day of November, 1884.

JEHU H. HUNGATE.

Witnesses:
R. P. GODDARD,
JAMES P. WILLIAMS.